United States Patent [19]
Duncan

[11] 3,811,488
[45] May 21, 1974

[54] TIRE WITH AN UPPER SIDEWALL PROTECTOR

[75] Inventor: Eathel Lee Duncan, Akron, Ohio

[73] Assignee: The Goodyear Tire & Rubber Company, Akron, Ohio

[22] Filed: Aug. 21, 1972

[21] Appl. No.: 282,888

[52] U.S. Cl. .............................. 152/209 R, 152/353
[51] Int. Cl. ............................................. B60c 11/04
[58] Field of Search............ 152/209 R, 209 D, 352, 152/353, 354, 374

[56] References Cited
UNITED STATES PATENTS
| | | | |
|---|---|---|---|
| 3,467,159 | 9/1969 | Semonin | 152/209 R |
| 3,457,981 | 7/1969 | Verdier | 152/209 R |

FOREIGN PATENTS OR APPLICATIONS
| | | | |
|---|---|---|---|
| 6,704,342 | 9/1968 | Netherlands | 152/209 R |
| 1,480,918 | 3/1969 | Germany | 152/209 R |

Primary Examiner—Lloyd L. King
Assistant Examiner—Robert Saifer
Attorney, Agent, or Firm—F. W. Brunner; H. E. Hummer

[57] ABSTRACT

A radial tire provided with a plurality of tread rib extensions which are disposed in the upper sidewalls of the tire and project outwardly of the sidewalls to protect them from pointed rocks and other sharp-edged objects which could pierce the sidewalls and ruin the tire.

14 Claims, 3 Drawing Figures

TIRE WITH AN UPPER SIDEWALL PROTECTOR

BACKGROUND OF THE INVENTION

The invention is well suited for tires used on earthmoving equipment operated on rough terrain, and especially for radial tires used on such equipment, such tires commonly referred to as off-the-road tires.

Tire designers have always been concerned about protecting the sidewalls of a tire, especially the upper sidewall areas, i.e. the portion of the sidewalls adjacent the "shoulders" which are the juncture of the tread and sidewalls. These areas of the tire are highly susceptible to cutting by sharp-edged objects. For this reason, many early designed tires have particularly odd-shaped treads which extend laterally beyond the sidewalls of the tires to prevent any rocks or sharp objects from striking the more vulnerable sidewalls of the tire. These early designs were rather crude and later, more sophisticated designs utilized the lugs or ribs of the tread as a means for protecting the sidewall. This was accomplished by literally wrapping the ribs partially around the sidewalls of the tire, i.e. extending them from the tread outwardly beyond the sidewalls, then upwards along the sidewalls and terminating them, for example, midway up the sidewalls of the tire. The overall width of the projecting ribs or lugs is dictated by the clearances required between the tires and adjacent portions of the vehicles on which the tires are mounted. Generally, the projecting ribs are not as pronounced on a bias-type tire as a radial tire, because the overlapping reinforcement cords of the carcass plies of a bias-type tire provide a crosshatching effect which reinforces the sidewalls making them less susceptible to cutting than the sidewall of a radial tire where the reinforcement cords extend in a radial direction and are spaced apart by rubber material which is highly susceptible to cutting by sharp objects.

The projecting ribs, or protectors, for the sidewalls are formed by increasing the amount of rubber material in critical areas of the upper sidewalls, such material being designed to absorb any cuts or sudden impact loads inflicted on the tire by huge rocks or boulders and any sharp-edged objects. The projecting ribs are composed of resilient material and consequently tend to envelop a sharp-edged object as the tire passes over the object, rather than reject the object and deflect it out of the pathway of the tire. Thus, the configuration of the projecting rib is not critical from the standpont of absorbing cuts.

The configuration of the projecting rib is esthetically important, since it is vital that the tire have a rugged appearance to make it more attractive and saleable. The provision of massive projecting ribs on radial tires, however, has caused certain problems such as cracking in the sidewalls at the juncture of the projecting ribs with the sidewalls. It has been discovered that the particular configuration of the projecting ribs at their juncture with the side walls is important. The invention is directed to providing an improved projecting rib for eliminating or substantially decreasing any sidewall cracking at the juncture of the projecting rib with the sidewall of the tire.

Briefly stated, the invention is in a pneumatic tire having at least one projecting rib or lug which extends in a direction from the centerplane of the tire beyond at least one of the sidewalls and which is formed between an inner surface and an outer surface which is farther measured radially from the center axis of the tire than the inner surface. A fillet is provided at the juncture of the inner radial surface and sidewall and has an outer curved surface forming a smooth transitional surface between the inner radial surface and adjacent surface of the sidewall. The curved surface of the fillet is concave relative to the centerplane and has a radius (R) of curvature which is 0.4 to 1.3 times the section height (SH) of the tire when the tire is unloaded and inflated.

Another aspect of the invention is the provision of a projecting lug having an outer radial surface which is convexly curved relative to the centerplane and has a radius ($R_1$) of curvature which is 0.15 to 0.55 times the section height (SH) of the tire when the tire is unloaded and inflated.

A further aspect of the invention is the provision of means within grooves separating adjacent projecting lugs for absorbing cuts inflicted in this area of the tire by sharp-edged objects.

DESCRIPTION OF THE DRAWING

The following description of the invention will be better understood by having reference to the annexed drawing, wherein.

ENVIRONMENT OF THE INVENTION

Figure 2:
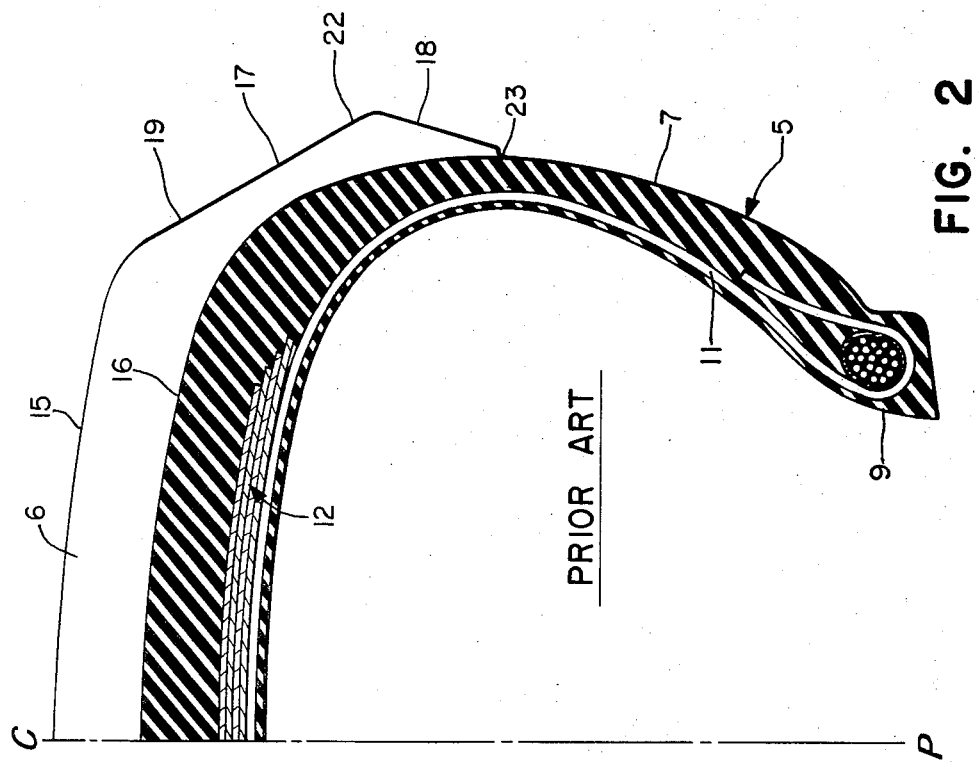
FIGS. 1 and 2 are partial sections of tires showing different configurations of projecting lugs in the prior art.

Referring generally to the drawing, there is shown a pneumatic tire 5 which is especially suitable for use on earthmoving equipment. The tire 5 essentially comprises a tread 6 and a pair of sidewalls 7 and 8 which extend from the thread 6 and terminate at a pair of annular beads 9 and 10. The tire 5 is preferably of the radial type and includes a conventional layer 11 of textile or metal cords which reinforce the carcass plies of the tire 5 and are disposed at angles in the range of from 70°–90° measured from a plane C-P passing through the mid-circumferential centerline of the tread 6, such plane being referred to as the centerplane. The tire 5 is normally symmetrical in relation to the centerplane. The angular measurement of any reinforcement cords are expressed in relation to a tire which is unloaded and inflated to pressure normally recommended by the manufacturer of the tire.

A belt structure, generally indicated at 12, is provided between the tread 6 and layer 11 of carcass reinforcement cords for annularly reinforcing the tire 5. The belt structure 12 comprises a plurality of juxtaposed layers 13 and 14 of textile or metal reinforcement cords which are disposed at angles in the range of from 0° to 24° measured from the centerplane of the tire 5.

The thread 6 is usually broken up into a pattern of alternating ribs 15 and grooves 16 for increasing the traction of the tire 5, especially in soft terrain.

The ribs 15 project in a direction from the centerplane outwardly beyond the sidewalls 7 and 8 of the tire 5, forming projecting ribs, lugs, or rib extensions 17 for protecting the sidewalls 7 and 8 from sharp-edged objects normally encountered by the tire 5.

The projecting lugs 17 are each formed by an inner surface 18 and an outer surface 19 which is farther, measured radially from the center axis of the tire 5, than the inner surface 18. The projecting lugs 17 are disposed in the upper sidewalls of the tire 5, i.e. the portion of the sidewalls adjacent the tread 6 and farthest from the beads 9 and 10. The outer radial surface 19 of each projecting lug 17 extends from the shoulder 20 of the tire 5, i.e. the juncture between the thread 6 and upper sidewall of the tire 5, in a direction towards the midpoint 21 of the adjacent sidewall 7 or 8. The section diameter (SD) is measured at opposing midpoints 21 of the sidewalls 7 and 8 and generally represents the maximum width of the tire, excluding any unusual protuberances or projections.

Figure 1:
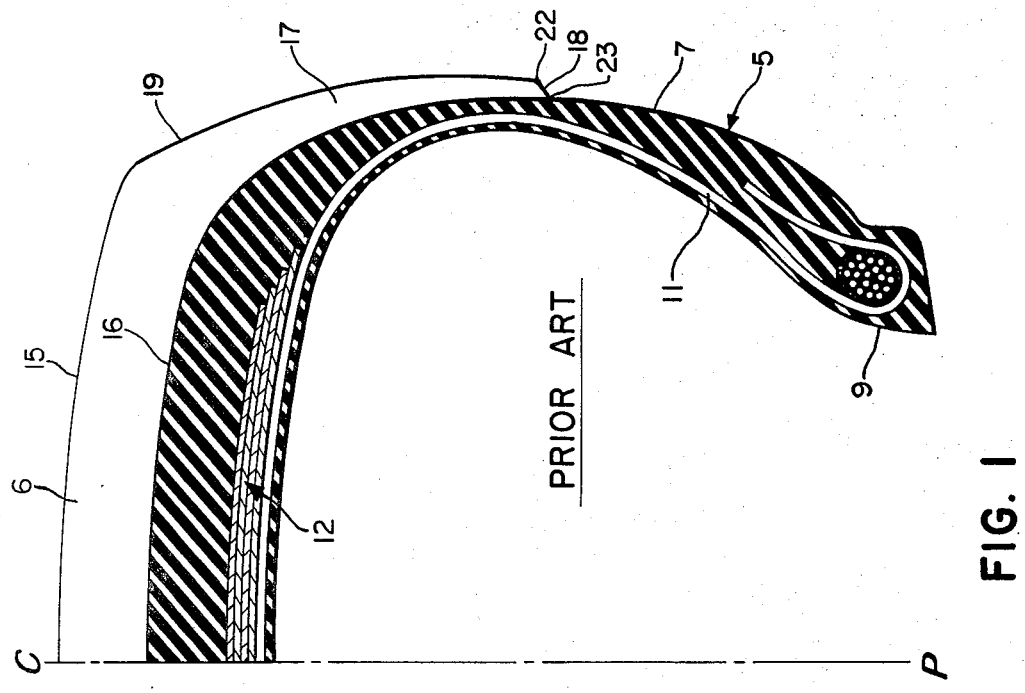

The projecting lug 17 shown in FIG. 1, has a curved outer radial surface 19 which is long compared to the short flat inner radial surface 18. Other tires in the prior art utilize a projecting lug 17 similar to that shown in FIG. 1, except the outer radial surface is flat and disposed at a high angle, relative to the center axis of the tire 5 and measured in a clockwise direction from the center axis. The projecting lug 17 shown in FIG. 2 is conical being formed by flat inner and outer radial surfaces 18 and 19 which intersect and form a ridge 22 which extends outwardly of the adjacent sidewall. This configured projecting lug was found especially suitable for tires used on road graders which are oftentimes run on sloping surfaces on which are found pointed rocks and other sharp-edged objects which might cut and ruin the tire 5 except for the protecting lugs 17.

A definite line of demarcation is formed at the juncture 23 of the projecting lugs 17 with the sidewalls 7 and 8. It has been discovered that cracking oftentimes occurs adjacent the juncture 23 in radial tires when massive projecting lugs 17 are used. This problem is eliminated or substantially reduced by providing a fillet 25 at each of the junctures 23.

THE INVENTION

Figure 3:
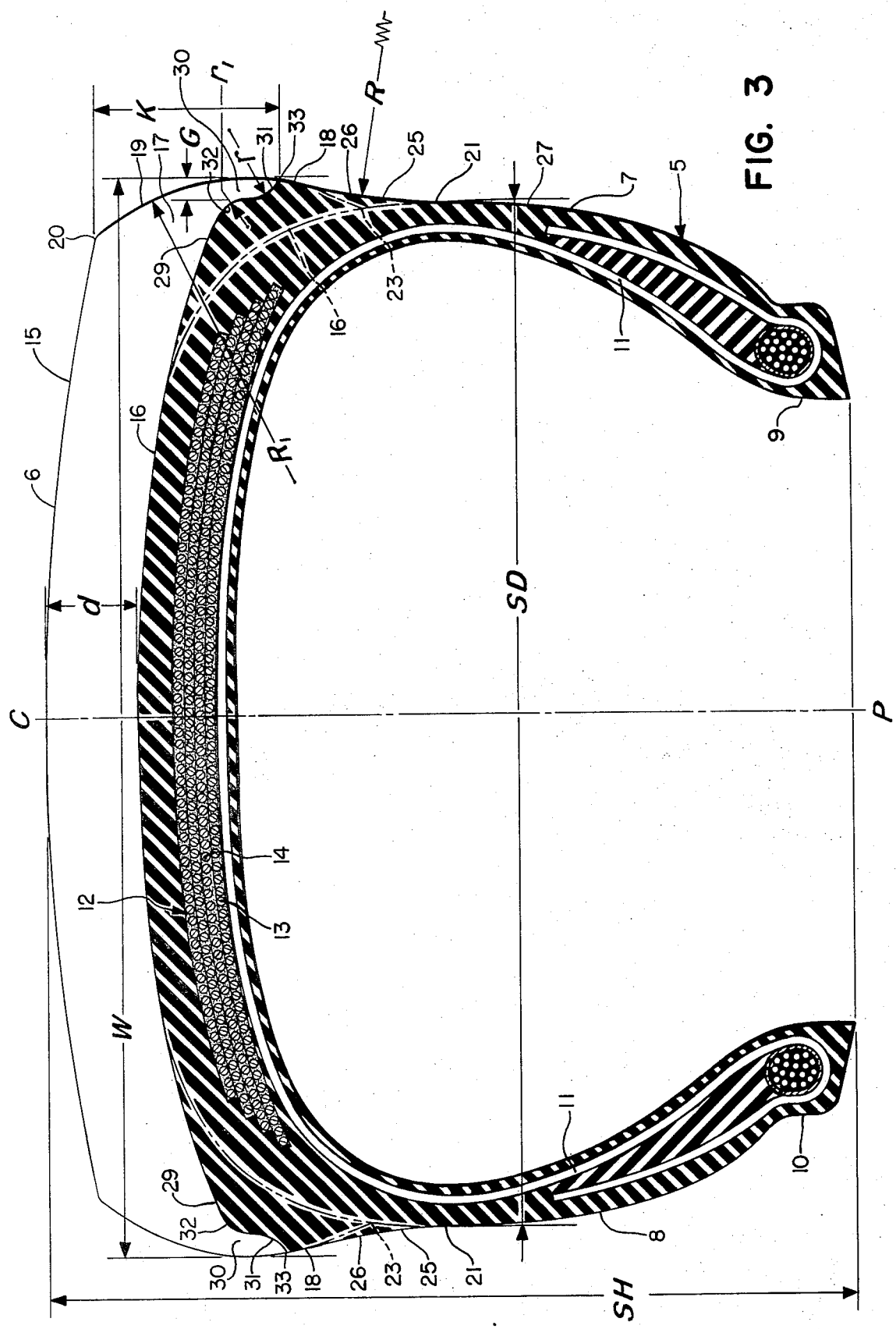
FIG. 3 is a cross-section of a tire made in accordance with the invention.

The fillets 25 (FIG. 3) are preferably composed of unreinforced rubber material although, in some instances, it may be desirable placing textile or metal reinforcement cords in the rubber material. The fillets 25 have outer surfaces 26 which are appropriately curved to form smooth transitional surfaces between the inner radial surfaces 18 of the projecting lugs 17 and the adjacent surfaces 27 of the sidewalls 7 and 8. The outer curved surface 26 of each fillet 25 is concave relative to the centerplane and has a radius R of curvature which is taken on a line passing through opposing midpoints 21 of the sidewalls 7 and 8 and is from 0.4 to 1.3 times the section height (SH) of the tire 5 when the tire is unloaded and inflated as previously indicated. The inner and outer radial surfaces 18 and 19 of each projecting lug 17 are convex relative to the centerplane of the tire 5 and preferably have a common radius $R_1$ of curvature which is 0.15 to 0.55 times the section height (SH) of the tire 5. The outer exposed surfaces 18, 19, and 26 bounding each of the projecting lugs 17, form a smooth continuous S-type curve extending between the shoulder 20 and the midpoint 21 of the adjacent sidewall 7 or 8. It has been found that the addition of the rubber fillets 25 helps eliminate this problem of cracking. The overall width W of opposing projecting lugs 17 is preferably 1 to 1.2 times the section diameter (SD) of the tire 5.

As previously indicated, another aspect of the invention is the provision of protrusions or bulges 29 in the grooves 16 adjacent the projecting lugs 17. The bulges 29 are preferably composed of unreinforced rubber material designed for absorbing cuts inflicted by sharp-edged objects in much the same manner as the projecting lugs 17 absorb cuts and impact loads to protect the sidewalls 7 and 8. The grooves 16 of larger tires are sufficiently wide for receiving pointed rocks and other sharp-edged objects. As shown in FIGS. 1 and 2 and in dotted line in FIG. 3, the sidewalls 7 and 8 are normally designed as a smooth continuation of the grooves 16. It has been found desirable extending the rubber bulges or masses 29 outwardly from the centerplane to a point where the bulges 29 intersect the outer exposed surfaces 18, 19 of the projecting lugs 17 at or close to the points of maximum width (W) of the projecting lugs 17. The additional rubber material in this area also helps eliminate the problem of sidewall cracking previously referred to. However, this practically eliminates the projecting lugs 17 which is undesirable from an esthetic viewpoint. Therefore, it has been found advantageous cutting back each rubber mass 29 closest the outer surfaces 18, 19 of the adjacent projecting lugs 17 to form a constricted channel 30 which extends upwardly towards the midpoint 21 of the adjacent sidewall 7 or 8.

The outer surfaces 31 and 32 of each rubber bulge 29 are oppositely curved in relation to each other, the first surface 31 closest the outer surfaces of the adjacent projecting lugs 17 being concave relative to the centerplane and the other second surface 32 being convex relative to the centerplane. The first surface 31 of each rubber bulge 29 has a radius $r$ of curvature which is preferably 0.3 to 1 times the non-skid $d$ which is the depth of the groove 16 measured at the centerplane. The second surface 32 of tread rubber bulge 17 has a radius $r_1$ of curvature which is preferably 0.5 to 1.5 times the non-skid $d$. The width or gauge G of the narrow channel 30 is preferably 0.1 to 2.5 times the non-skid $d$. The juncture 33 of each rubber mass 29 with the outer exposed surfaces of the adjacent projecting lugs 17, is located a distance K, measured from the shoulder 20 in a radial direction toward the center axis of the tire 5, which is preferably 0.15 to 0.4 times the section height (SH) of the tire 5.

Thus, there has been provided a smooth transitional curved surface 26 between the inner radial surface 18 of each projecting lug 17 and adjacent surface of the sidewall 7 or 8. This transitional surface 26 is concave relative to the centerplane of the tire 5. The inner and outer radial surfaces 18 and 19 have a common radius $R_1$ of curvature and are convex relative to the centerplane of the tire 5. The overall appearance of each projecting lug 17 is one of a smooth continuous S-curve distinguished from sharp angular surfaces forming projections of prior known tires. In addition, the grooves are each provided with additional rubber material which intersects the exposed surfaces of the adjacent projecting lugs intermediate opposing ends of the lug at the tread 6 and adjacent sidewall 7 or 8.

While certain representative embodiments and details have been shown for the purpose of illustrating the invention, it will be apparent to those skilled in the art that various changes and modifications may be made therein without departing from the spirit or scope of the invention.

What is claimed is:

1. A tire comprising, a ground contacting thread; a pair of sidewalls; a plurality of projecting lugs arcuately spaced around at least one of the upper sidewalls of the tire adjacent the tread, for protecting the adjacent sidewall of the tire from sharp objects which can pierce the sidewall and ruin the tire, the lugs extending in a direction from the centerplane of the tire beyond the adjacent sidewall, each of the lugs formed between an inner surface and an outer surface which is farther, measured radially from the center axis of the tire, than the inner surface; and characterized by, (i) a fillet at the juncture of the inner radial surface of each of the projecting lugs and adjacent sidewall, the fillets each having an outer curved surface between the inner radial surface and adjacent sidewall, the outer curved surface of the fillets being concave relative to the centerplane and having a radius (R) of curvature which is 0.4 to 1.3 times the section height (SH) of the tire when the tire is unloaded and inflated, and (ii) a groove separating each pair of adjacent lugs and intersecting outer surfaces of the lugs at points which are a distance (K), measured from the intersection of the tread and lugs towards the center axis of the tire, which is 0.15 to 0.4 times the section height (SH) of the tire when the tire is unloaded and inflated, the grooves intersecting the lugs adjacent portions of the lugs in farthest spaced relation from the centerplane of the tire.

2. The tire of claim 1, characterized in that each projecting lug has an outer radial surface having a radius ($R_1$) of curvature which is 0.15 to 0.55 times the section height (SH) of the tire when the tire is unloaded and inflated.

3. The tire of claim 2, characterized in that each projecting lug has inner and outer radial surfaces which have a common radius ($R_1$) of curvature and are convex relative to the centerplane of the tire.

4. A tire comprising, a ground contacting tread; a pair of sidewalls; a plurality of projecting lugs arcuately spaced around at least one of the upper sidewalls of the tire adjacent the tread, for protecting the adjacent sidewall of the tire from sharp objects which can pierce the sidewall and ruin the tire, the lugs extending in a direction from the centerplane of the tire beyond the adjacent sidewall, each of the lugs formed between an inner surface and an outer surface which is farther, measured radially from the center axis of the tire, than the inner surface; and characterized by, (i) a curved surface which extends between the inner radial surface of each projecting lug and adjacent surface of an adjacent sidewall, and is concave relative to the centerplane of the tire, and has a radius (R) of curvature which is 0.4 to 1.3 times the section height (SH) of the tire when the tire is unloaded and inflated, and (ii) a groove separating each pair of adjacent lugs and intersecting outer surfaces of the lugs at points which are a distance (K), measured from the intersection of the tread and lugs towards the center axis of the tire, which is 0.15 to 0.4 times the section height (SH) of the tire when the tire is unloaded and inflated, the grooves intersecting the lugs adjacent portions of the lugs in farthest spaced relation from the centerplane of the tire.

5. The tire of claim 4, characterized in that each projecting lug has an outer radial surface which is convexly curved relative to the centerplane and has a radius ($R_1$) of curvature which is 0.15 to 0.55 times the section height (SH) of the tire when the tire is unloaded and inflated.

6. The tire of claim 4, characterized in that each projecting lug has inner and outer radial surfaces which are convex relative to the centerplane of the tire and have a common radius ($R_1$) of curvature which is 0.15 to 0.55 times the section height (SH) of the tire when the tire is unloaded and inflated.

7. The tire of claim 4, characterized in that each projecting lug has intersecting inner and outer radial surfaces forming a ridge which extends outwardly of the adjacent sidewall when the tire is in a loaded and unloaded condition.

8. The tire of claim 4, characterized in that the concave surface of each lug joins an adjacent surface of an adjacent sidewall such that a line tangential to the concave surface at the juncture of the concave surface with the adjacent surface of the sidewall, is also tangential to the adjacent surface of the sidewall.

9. A tire comprising a ground contacting tread; a pair of sidewalls; a plurality of projecting lugs arcuately spaced around at least one of the upper sidewalls of the tire adjacent the tread, for protecting the adjacent sidewall of the tire from sharp objects which can pierce the sidewall and ruin the tire, the lugs extending in a direction from the centerplane of the tire beyond the adjacent sidewall, each of the lugs formed between an inner surface and an outer surface which is farther, measured radially from the center axis of the tire, than the inner surface; and characterized by (i) a groove separating each pair of adjacent lugs and intersecting outer surfaces of the lugs at points which are a distance (K), measured from the intersection of the tread and lugs towards the center axis of the tire, which is 0.15 to 0.4 times the section height (SH) of the tire when the tire is unloaded and inflated, the grooves intersecting the lugs adjacent portions of the lugs in farthest spaced relation from the centerplane of the tire, and (ii) in that each projecting lug has an outer radial surface which has a radius ($R_1$) of curvature which is 0.15 to 0.55 times the section height (SH) of the tire.

10. The tire of claim 9, characterized in that the inner and outer radial surfaces of each projecting lug have a common radius ($R_1$) of curvature and are convex relative to the centerplane of the tire.

11. The tire of claim 9 characterized in that the overall width (W) of a pair of opposing lugs projecting from opposing sidewalls is 1 to 1.2 times the section diameter (SD) of the tire.

12. A tire comprising a tread, a pair of sidewalls extending from the tread, at least two spaced projecting lugs disposed in an upper sidewall adjacent the tread and extending in a direction from the centerplane of the tire laterally beyond an adjacent sidewall, and characterized by a groove which separates the projecting lugs and intersects outer surfaces of the lugs at points which are a distance (K), measured from the intersection of the tread and lugs towards the center axis of the tire, which is 0.15 to 0.4 times the section height (SH) of the tire when the tire is unloaded and infalted, the groove intersecting the lugs adjacent portions of the lugs in farthest spaced relation from the centerplane of the tire.

13. The tire of claim 12, characterized in that the groove includes a resilient protuberance adjacent the outer surfaces of the lugs, a portion of the protuberance, closest said surfaces, being removed to form a channel which is generally parallel to the centerplane of the tire.

14. The tire of claim 13, wherein the channel, closest the center axis of the tire, is concavely curved relative to the centerplane and has a radius of curvature (r) which is from 0.3 to 1 times the depth (d) of the groove measured at the centerplane.

* * * * *